(12) United States Patent
Ai

(10) Patent No.: US 7,717,249 B2
(45) Date of Patent: May 18, 2010

(54) ELECTRO-MECHANICAL GEAR SELECTOR

(75) Inventor: Xiaolan Ai, Stark, OH (US)

(73) Assignee: The Timken Company, Canton, OH (US)

( * ) Notice: Subject to any disclaimer, the term of this patent is extended or adjusted under 35 U.S.C. 154(b) by 825 days.

(21) Appl. No.: 10/585,024

(22) PCT Filed: Jan. 14, 2005

(86) PCT No.: PCT/US2005/001381

§ 371 (c)(1), (2), (4) Date: Jun. 28, 2006

(87) PCT Pub. No.: WO2005/068865

PCT Pub. Date: Jul. 28, 2005

(65) Prior Publication Data

US 2009/0173590 A1    Jul. 9, 2009

Related U.S. Application Data

(60) Provisional application No. 60/537,243, filed on Jan. 14, 2004.

(51) Int. Cl.
*F16D 27/02* (2006.01)
*F16D 11/12* (2006.01)

(52) U.S. Cl. .................. 192/90; 192/55.3; 192/71; 192/89.21

(58) Field of Classification Search .............. 74/372; 192/84.8, 93 C, 55.3
See application file for complete search history.

(56) References Cited

U.S. PATENT DOCUMENTS

| | | | | | |
|---|---|---|---|---|---|
| 1,596,192 | A | * | 8/1926 | Knapp | 74/372 |
| 2,136,104 | A | * | 11/1938 | Jessen | 74/333 |
| 2,621,494 | A | * | 12/1952 | Cross | 464/29 |
| 2,861,461 | A | * | 11/1958 | Kreidler | 74/371 |
| 4,860,866 | A | * | 8/1989 | Stanek | 192/71 |
| 5,305,651 | A | * | 4/1994 | Perego | 74/372 |

FOREIGN PATENT DOCUMENTS

| | | |
|---|---|---|
| DE | 1049714 | 1/1959 |
| EP | 0367853 | 5/1990 |
| EP | 0508967 | 10/1992 |
| EP | 0524691 | 1/1993 |
| FR | 2367227 | 5/1978 |

OTHER PUBLICATIONS

PCT Search Report PCT/2005/001381, May 4, 2005.

* cited by examiner

*Primary Examiner*—Richard M. Lorence
(74) *Attorney, Agent, or Firm*—Polster, Lieder, Woodruff & Lucchesi, L.C.

(57) ABSTRACT

An electromagnetic gear-clutch assembly (1) is disclosed. The device comprises a gear (10) having grooves (10*c*) that open inwardly toward the axis and extend axially. A hub (12) is located within the gear (10) where it is capable of rotating within the gear (10). The hub (12) has grooves (12*k*) that open outwardly away from the axis and extend axially. Keys (17) are located within the grooves (12*k*) of the hub (12) and are capable of moving radially toward and away from the axis, the arrangement being such that when the keys (17) are permitted to move away from the axis, at least one will enter one of the grooves (10*c*) in the gear (10) to couple the gear (10) and hub (12) so that they will rotate in unison. The device also comprises an actuator assembly (3) for effecting radial displacement of the keys (17).

8 Claims, 10 Drawing Sheets

ELECTRO-MECHANICAL GEAR SELECTOR

CROSS-REFERENCE TO RELATED APPLICATIONS

This application is related to U.S. Provisional Patent Application No. 60/537,243 filed, Jan. 14, 2004 from which priority is claimed, hereby incorporated by reference.

TECHNICAL FIELD

The present invention relates to a positive engagement clutch in general and to an electromagnetic actuated gear selector for automated manual transmissions in particular.

BACKGROUND ART

Synchro-mesh devices are commonly used in vehicle gear boxes to simplify the operation of gear change so that this can be done by unskilled drivers without the occurrence of clashes and consequent damage. These devices usually incorporate a positive engagement clutch such as a dog clutch and a friction clutch such as a cone clutch. These clutches were designed primarily for torque-interrupt shifting where the power was momentarily cut off during gear change. The gear and shaft were first brought to the same speed by the friction clutch and then a positive engagement was made through actuating the positive engagement clutch. The synchro-mesh devices can be applied to sliding-mesh gear boxes but almost always used with constant-mesh boxes. In spite of their popularity, the synchro-mesh devices are not always trouble free. There are times when the jaws or teeth of one member of the positive engagement clutch are not aligned up well with the groove on the mating member and the clutch will not engage. In addition, synchro-mesh devices are prone to wear and are not suitable for power-shifting.

With the introduction of automated manual transmissions (AMT), the desire for trouble free engagement and power-shifting becomes increasingly strong. It almost becomes a necessity rather than a luxury. The present invention provides a compact gear selector, capable of providing positive and trouble free engagement and power-shifting operation.

European patent application EP 0 524 691 A1 discloses a mechanical transmission for toy automobiles. The transmission has gears for selecting different transmission ratios fitted onto a cylindrical element. In side the cylindrical element, an number of keys engage with an equal number of seats transmit movement between the gears at a different ratio between the input and output of the transmission.

European patent application EP 0 508 967 A1 discloses a gear shifting mechanism of the desmodromic type for providing a change gear with a command shaft equipped with desmodromic meshes. The mechanism includes a keying means having a plurality of grooves that couple with a corresponding plurality of pivots.

BRIEF DESCRIPTION OF THE DRAWINGS

In the accompanying drawings which form part of the specification.

Corresponding reference characters indicate corresponding parts throughout the several views of the drawings.

BEST MODES FOR CARRYING OUT THE INVENTION

Figure 1:
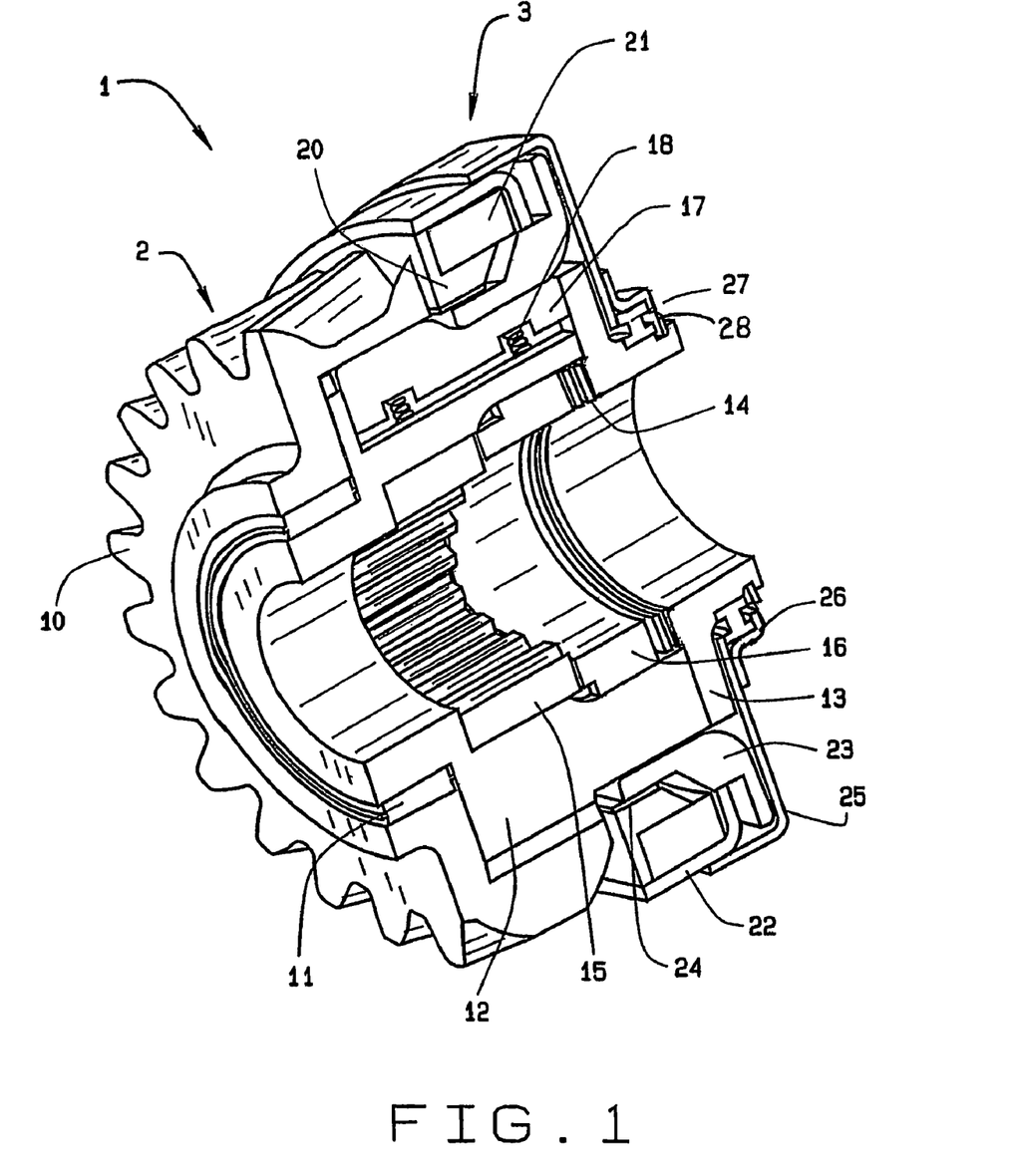
FIG. 1 is a perspective section view showing a preferred embodiment of a gear-clutch assembly.
Figure 2:
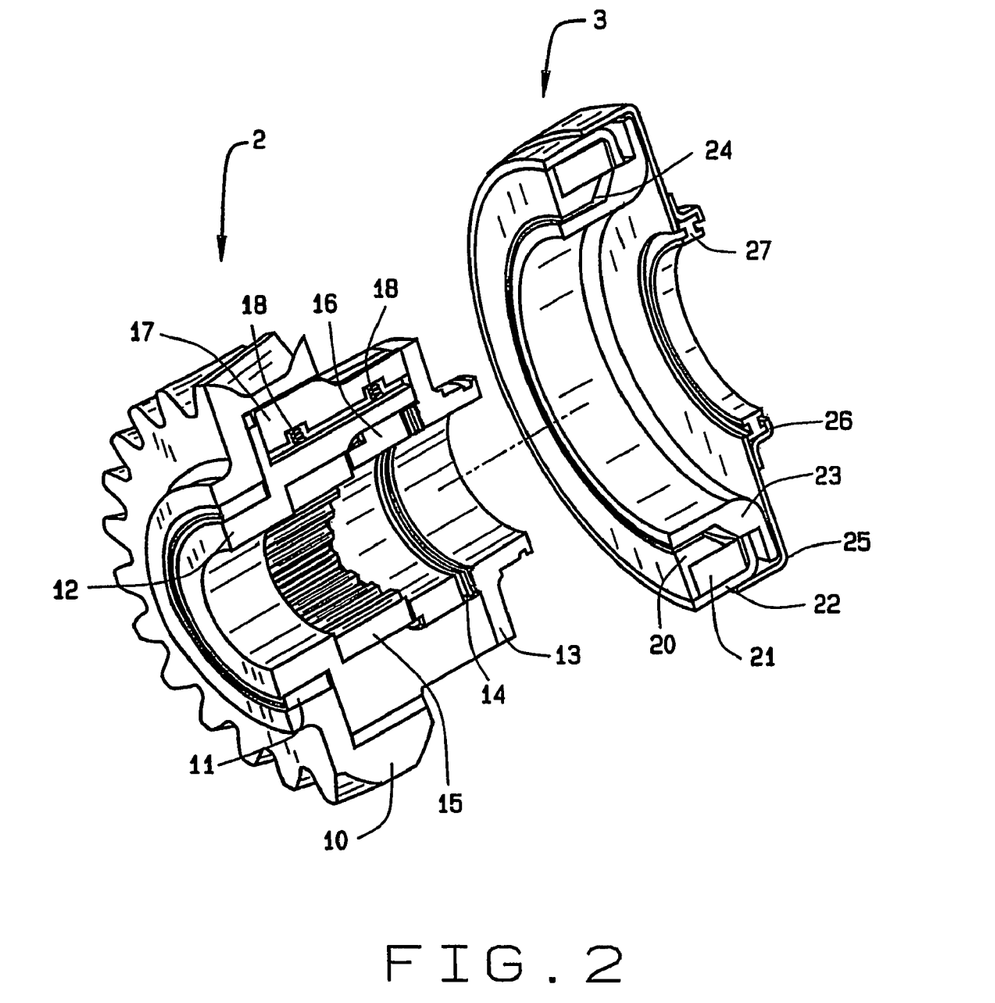
FIG. 2 is a partially exploded perspective section view showing a gear assembly and an electromagnetic actuator assembly.

As shown in FIGS. 1 and 2, a preferred embodiment of the invention, generally referred to as a gear-clutch assembly 1, comprises a gear assembly 2 and an electromagnetic actuator assembly 3.

The gear assembly 2 further comprises a gear 10, a needle bearing 11, a hub 12, a hub cover 13, a spring 14, an internally splined ramp ring 15, an externally splined ramp ring 16, a set of keys 17 and a set of coil springs 18.

Figures 3, 4:
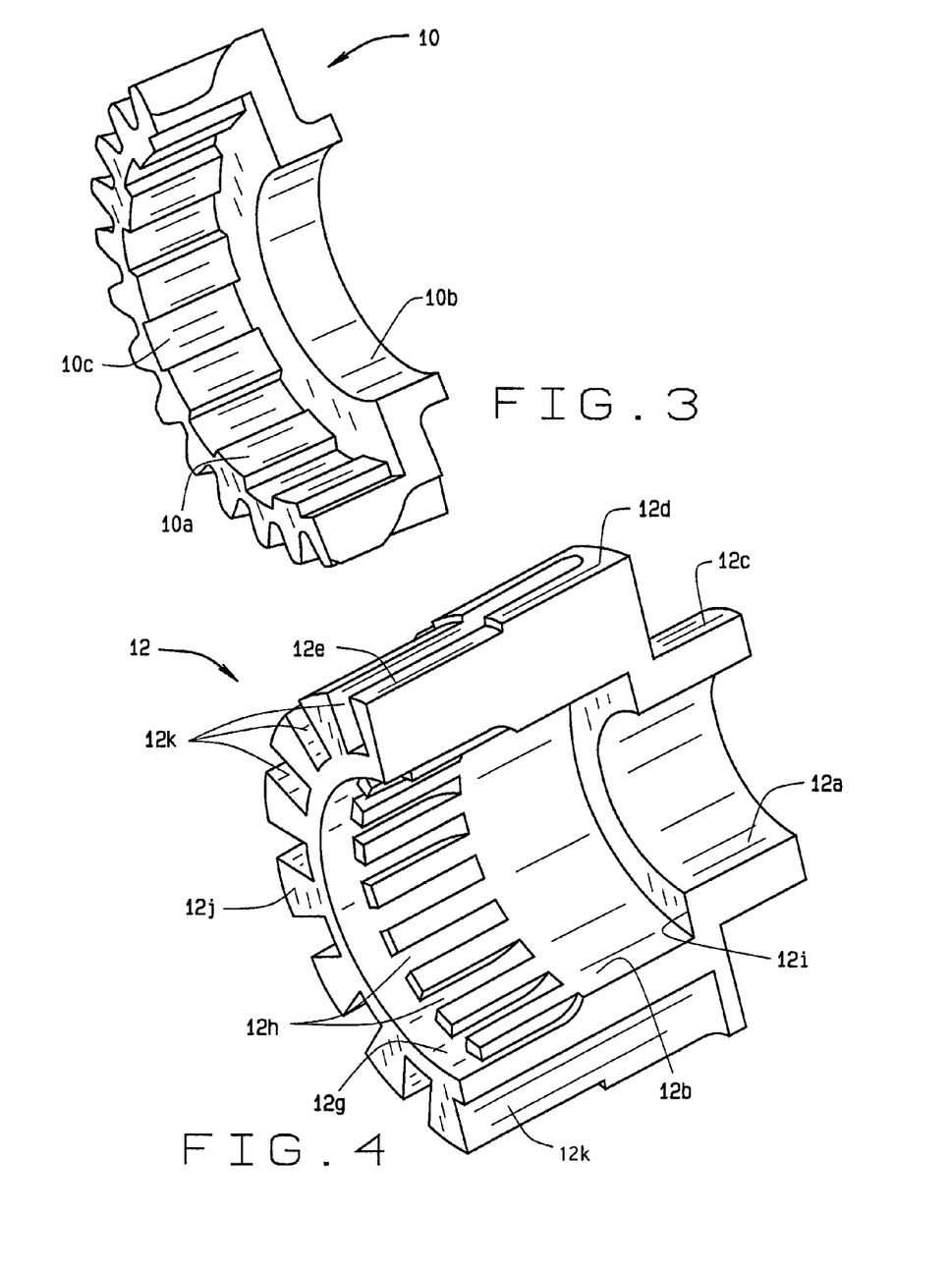
FIG. 3 is a perspective section view of a gear.
FIG. 4 is a perspective section view of a hub.

The electromagnetic actuator assembly 3 comprises a base ring 20, an electrical coil 21, a case 22, a plunge ring 23, a sleeve 24, a case holder 25, a bearing holder 26 and a ball bearing 27.

As shown in FIG. 3, the gear 10 is has two inner cylindrical surfaces, a first inner cylindrical surface 10a and a second inner cylindrical surface 10b. The first inner cylindrical surface 10a defines a plurality of axial grooves 10c that engage the set of keys 17. The second inner cylindrical surface 10b seats with an outer surface 11a of the needle bearing 11, which provides support for the gear 10.

Figure 11:
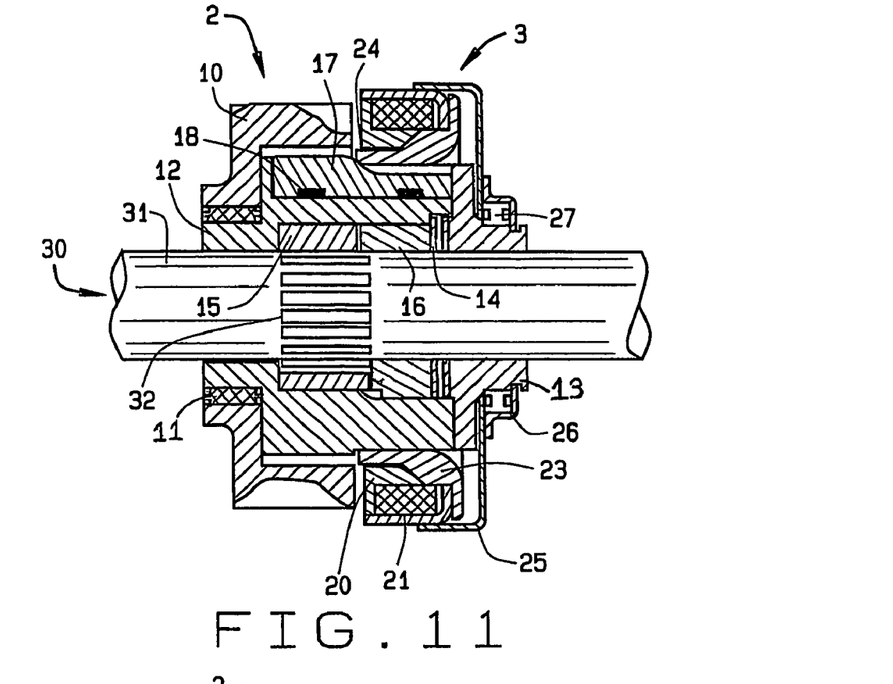
FIG. 11 is a section view of the gear-clutch assembly with the keys disengaged with the gear.
Figure 12:
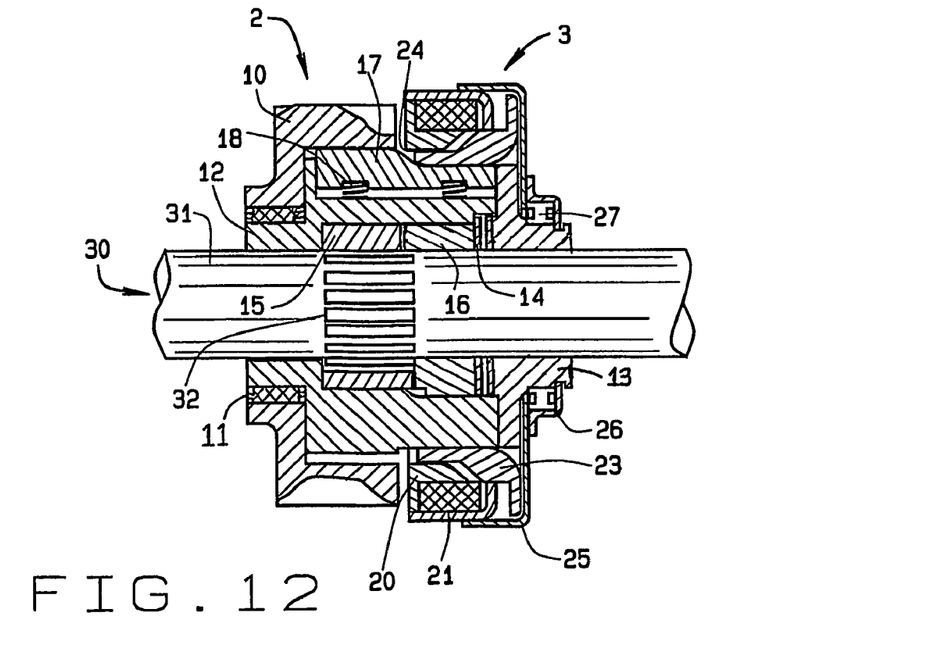
FIG. 12 is a section view of the gear-clutch assembly with the keys engaged with the gear.

As shown in FIG. 4, the hub 12 has a stepped outer surface including a first outer cylindrical surface 12c, a second outer cylindrical surface 12d, and a third outer cylindrical surface 12e. Second and third outer surfaces 12d and 12e define a plurality of axial grooves 12k that are open at an end face 12j and receive the set of keys 17. The first outer surface 12c seats with an inner surface 11b of the needle bearing 11 to support the bearing 11 and gear 10. The hub 12 also has a stepped inner surface including a first inner cylindrical surface 12a, a second inner cylindrical surface 12b, and a third inner cylindrical surface 12g. Second inner surface 12b defines a plurality of spline grooves 12h that extend axially about half the length of the inner surface 12b for engaging the externally splined ramp ring 16. As shown in FIGS. 11 and 12, the inner surface 12a of hub 12 engages a mating surface 31 of a supporting shaft 30, preferably with a sliding fit.

Figures 5, 6:
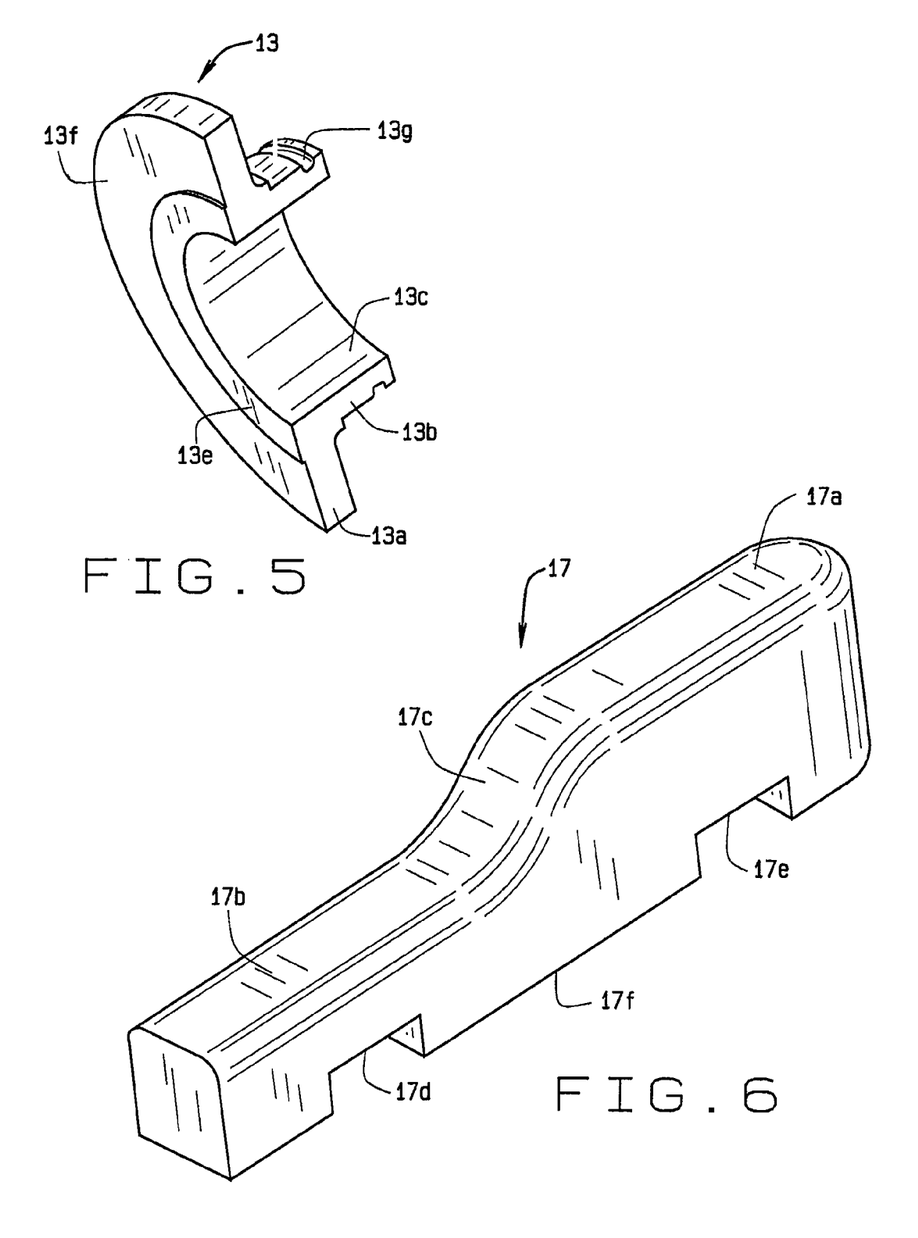
FIG. 5 is a perspective section view of a hub cover.
FIG. 6 is a perspective view of a key.

As shown in FIG. 5, hub cover 13 has a cover plate 13a and a spindle 13b extending axially from the center of the plate 13a. When assembled, the plate 13a is mounted with appropriate means, such as fasteners or welding, to the end face 12j of the hub 12 to secure the spring 14, the internally splined ramp ring 15, externally splined ramp ring 16, and set of keys 17 within the hub 12. An annular protrusion 13e extending from the face 13f of the cover plate 13a mates with the hub 12 to properly position the hub cover 13 during assembly. Hub cover 13 also has an inner cylindrical surface 13c that engages the mating surface 31 of the supporting shaft 30, preferably with a sliding fit. A snap ring groove 13g receives a snap ring 28 to secure the electromagnetic assembly 3 to the gear-clutch assembly 2, as shown in FIG. 1.

As shown in FIG. 6, each key 17 has top surfaces 17a and 17b connected by a ramp surface 17c. The bottom surface 17f of the key 17 define recesses 17d and 17e for receiving coil springs 18.

Figure 9A:
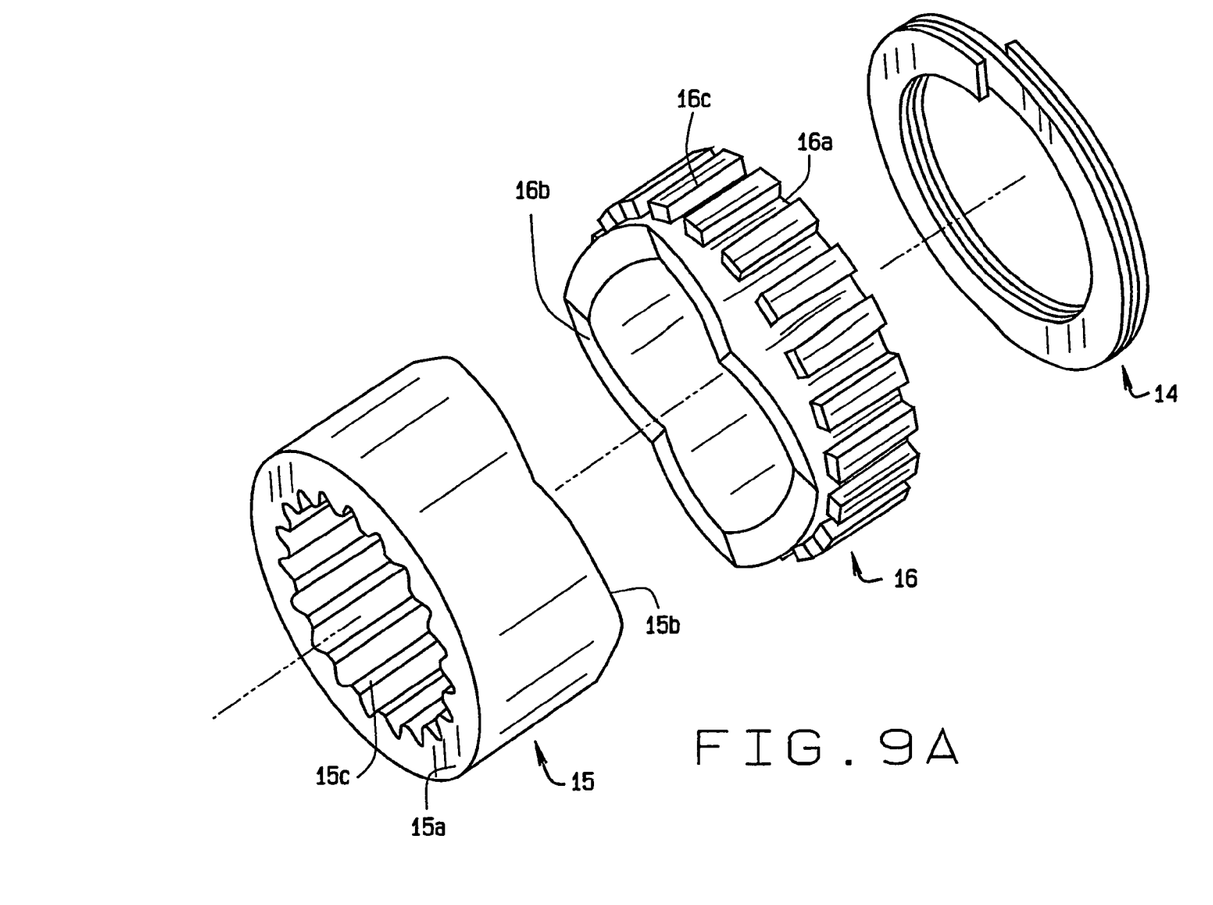
FIG. 9A is an exploded front perspective view of an internal ramp ring, an external ramp ring, and spring.
Figure 9B:
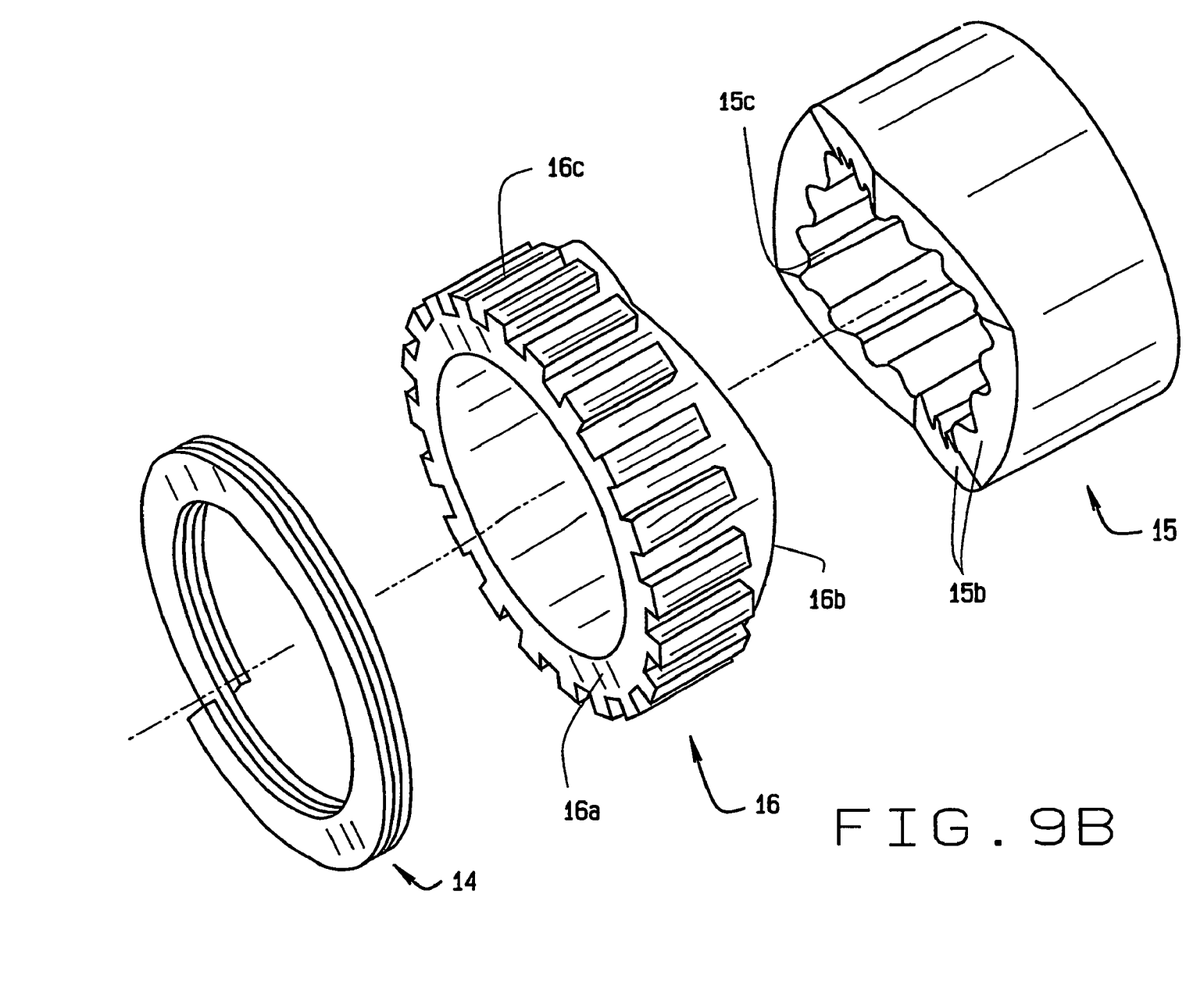
FIG. 9B is an exploded rear perspective view of an internal ramp ring, an external ramp ring, and spring.

As shown in FIGS. 9A and 9B, the internally splined ramp ring 15 is a cylindrical ring with internal splines 15c. The internally splined ramp ring 15 has a flat end face 15a and an arcuately shaped end face 15b defining three sets of bi-directional helical ramping surfaces that mate with the externally splined ramp ring 16.

The externally splined ramp ring 16 is a cylindrical ring with external splines 16c. The externally splined ramp ring 16 also has a flat end face 16a and an arcuately shaped end face 16b defining three sets of bi-directional helical ramping surfaces that mates with corresponding ramping surfaces of the end face 15b of ramp ring 15.

Figure 7:
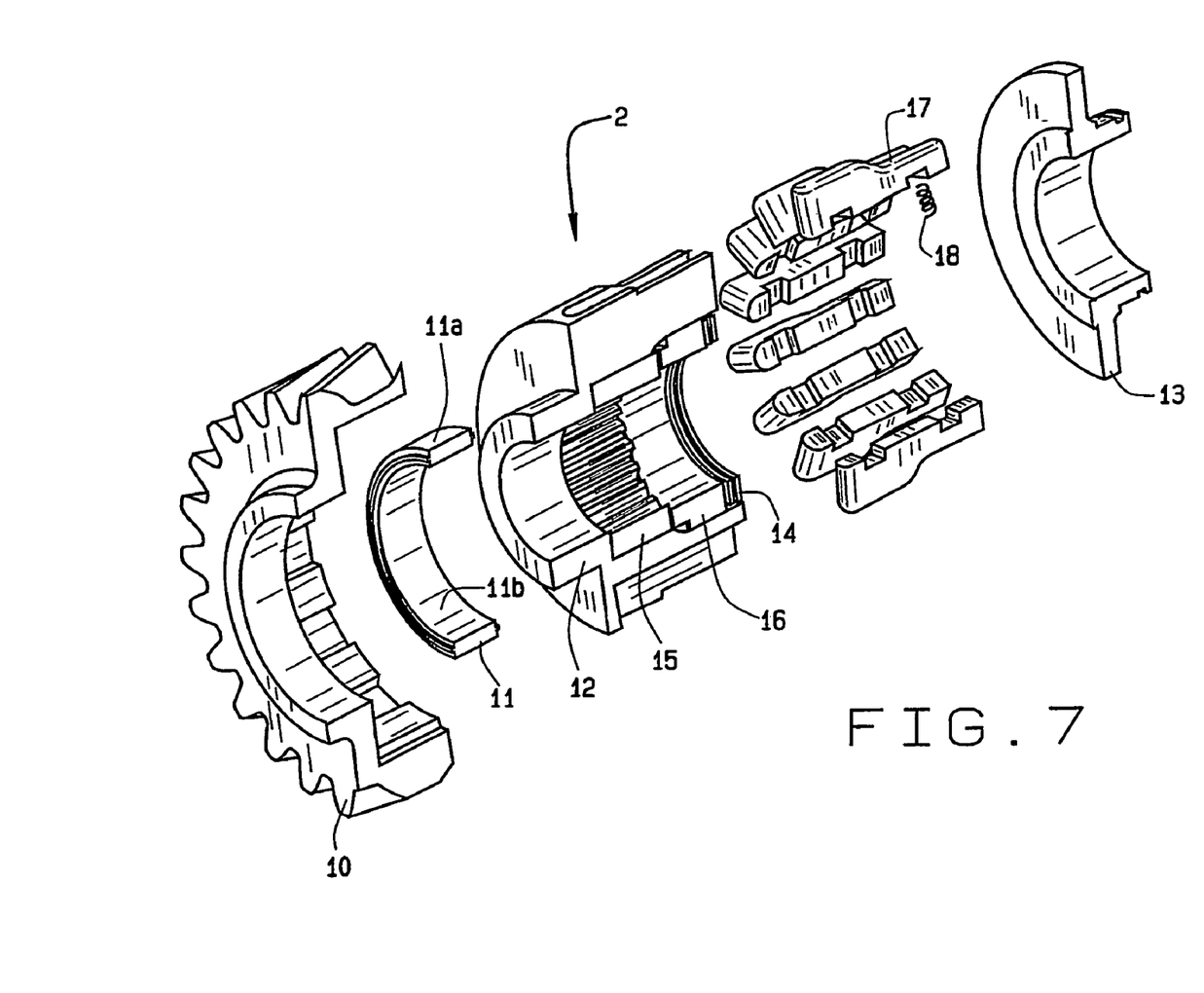
FIG. 7 is an exploded perspective section view of a gear assembly.
Figure 8:
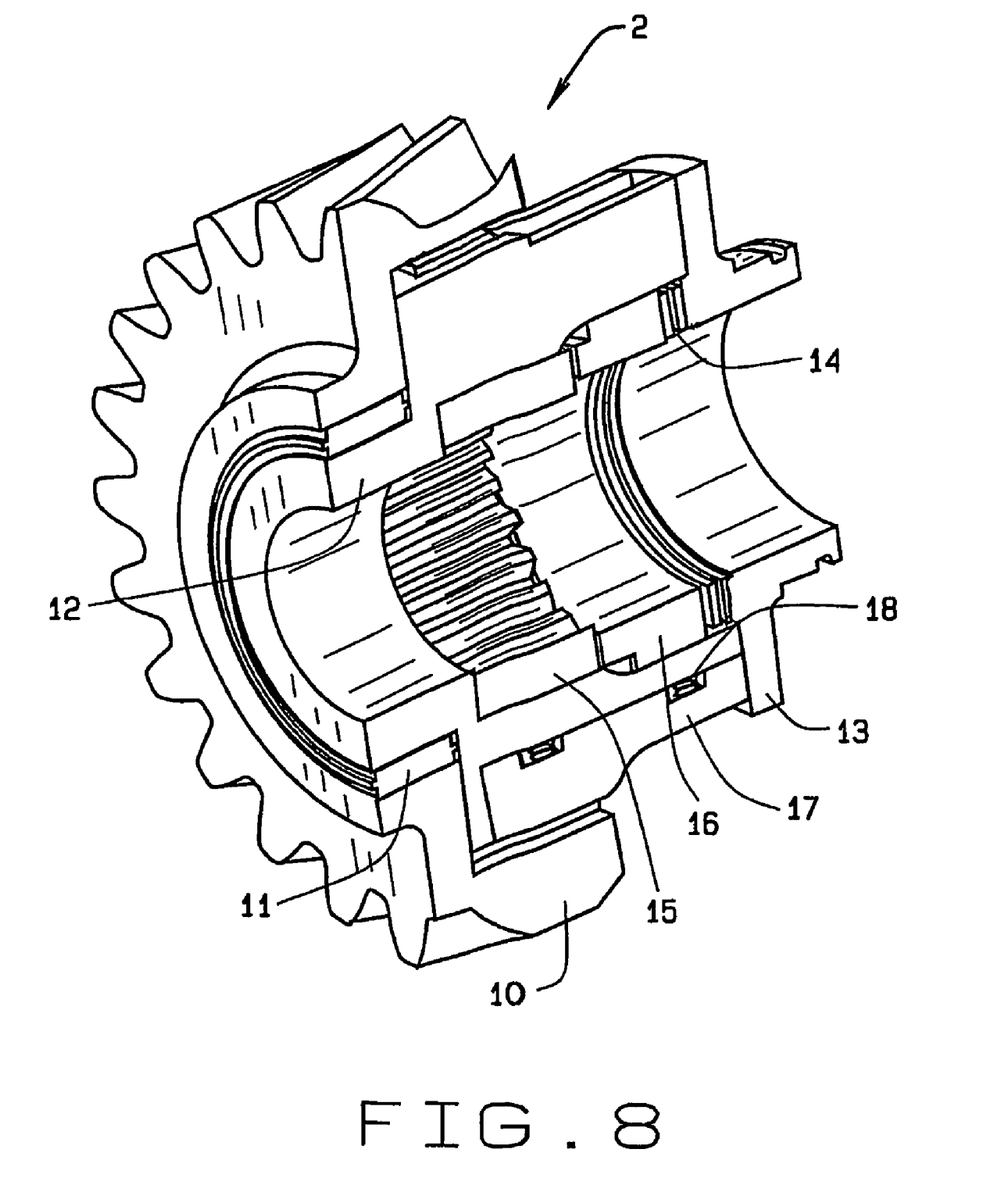
FIG. 8 is a perspective section view of the gear assembly.

As shown in FIGS. 7-8, to assemble the gear assembly 2 the internally splined ramp ring 15, externally splined ramp ring 16, the spring 14, the set of keys 17, and coil springs 18 are assembled inside of hub 12 and secured with hub cover 13. The internally splined ramp ring 15 is inserted into hub 12 until the flat end face 15a seats against the annular surface 12i of hub 12 (FIG. 4). The outer diameter of the ring 15 is sized to have a sliding fit with the hub 12 so that the ring 15 can rotate within the hub 12. When fully assembled, the internal splines 15c engage corresponding external spines 32 on the supporting shaft 30 to rotationally fix the internally splined ramp ring 15 with the supporting shaft 30. The externally splined ramp ring 16 is inserted into hub 12 so that the ramping surfaces of end face 16b mates with the ramping surfaces of end face 15b of the internally splined ramp ring 15. The external spline 16c of the externally splined ramp ring 16 is fitted into the internal spline 12h of hub 12 to rotationally fix the externally splined ramp ring 16 with the hub 12. However, the externally splined ramp ring 16 can move axially inside of hub 12. The inside diameter of the ramp ring 16 is sized to have a sliding fit with the supporting shaft 30 so that the ramp ring 16 can rotate around the shaft 30.

Spring 14 is inserted into the hub 12 so that, when fully assembled, the spring 14 is positioned between the cover plate 13a of hub cover 13 and the externally splined ramp ring 16. Spring 14 biases the externally splined ramp ring 16 axially, thereby firmly pressing the ramp ring 16 against the internally splined ramp ring 15. When assembled, the spring 14 and ramp rings 15 and 16 function as a torsion impact load damping device. During operation, a torsion impact load is transmitted through hub 12 to supporting shaft 30 or vice versa during engagement, which will be described further below. This torsion impact load causes the two ramp rings 15 and 16 to rotate relative to each other. As the ramp rings 15 and 16 rotate, the ramping surface of end faces 15b and 16b axially move the ramp rings 15 and 16 away from each other, thereby compressing the spring 14. The ramp rings 15 and 16 will continue to rotate until spring 14 is fully compressed. This provides a damping effect against torsion impact loads that effectively lowers the impact loads on various coupled elements including: the ramp ring 15 and corresponding supporting shaft 30, the keys 17 and corresponding grooves 12k of the hub 12, and the gear 10 and a corresponding mating gear (not shown).

As shown in FIGS. 7 and 8, each key 17 is inserted into a corresponding groove 12k of the hub 12 so that the key 17 is confined both in circumferential and axial directions by groove 12k and by the hub plate 13a of hub cover 13. There is a key 17 for each open-end groove 12k. The coil springs 18 are inserted in each recess 17d and 17e of each key 17. The springs 18 bias the key 17 to move outwardly from its retracted position at the bottom of the grooves 12k to an engaged position with corresponding grooves 10c of the gear 10. Finally, the plate 13a is mounted to the end face 12j of the hub 12 to secure the spring 14, the internally splined ramp ring 15, externally splined ramp ring 16, and set of keys 17 within the hub 12.

It is important to note that the number of grooves 10c on the inner surface 10a of the gear 10 is different from the number of keys 17 in the grooves 12k of the hub 12. The number of keys 17 is evenly divisible by the difference between the number of keys 17 and the number of grooves 10c on the inner surface 10a of the gear 10. For example, in the embodiment shown in FIG. 1, the number of keys 17 in hub 12 is 15 and the number of grooves on the inner surface of the gear is 12. Thus, for any given angular alignment between hub and gear there will always be (15−12=3) three keys 17 aligning respectively with three grooves 10c and receivable by these grooves.

Also, the width of grooves 10c is wider than the width of key 17 such that at any angular alignment between the gear 10 and hub 12 there will always be at least one key 17 that will align and be received by at least one groove 10c on the inner surface of the gear 10.

Figure 10:
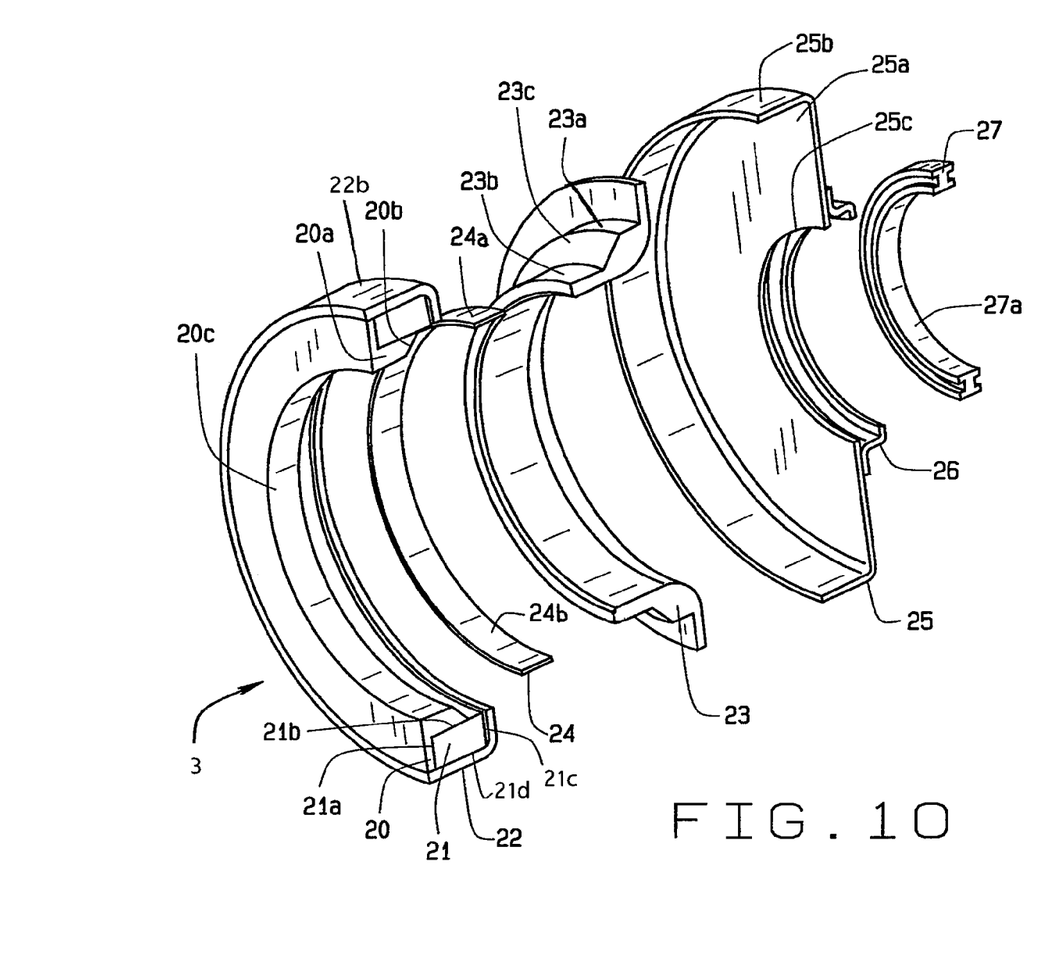
FIG. 10 is an exploded perspective section view of the electromagnetic actuator assembly.

The engagement between hub 12 and gear 10 is controlled and actuated by the electromagnetic actuator assembly 3, as shown in FIG. 10. The electromagnetic actuator assembly 3 comprises a base ring 20, an electric coil 21, a case 22, a plunge ring 23, a sleeve 24, a case holder 25, a bearing holder 26 and a ball bearing 27.

The base ring 20 is an annular ring with an inner rim 20a extending from inner perimeter and terminating with an angled face 20b. The base ring 20 seats against a front face 21a and an inner surface 21b of the electrical coil 21. An outer surface 24a of the sleeve 24 seats against an inner surface 20c of the base ring 20 to provide a bearing surface 24b for engaging the plunge ring 23.

The case 22 is an annular ring with an L-shaped cross section that seats against a back face 21c and an outer surface 21d of the electrical coil 21 and attaches to the base ring 20 by an appropriate means, such as welding or an interference fit. In this way, the base ring 20, case 22, and sleeve 24 create a housing around the electrical coil 21 that mates with the plunge ring 23.

The plunge ring 23 is an annular ring with a stepped rim projecting from the inner perimeter for mating with the base ring 20, case 22, and sleeve 24. The stepped rim has a first outer surface 23a and a second outer surface 23b connected by a ramp 23c. The outer diameter of the second surface 23b is appropriately sized to have a sliding fit with the bearing surface 24b of the sleeve 24. When fully assembled, the plunge ring 23 can move freely along the axial direction relative to the hub 12 as the electrical coil 21 is energized and de-energized.

The case holder 25 is a plate 25a having a rim 25b extending from the outer perimeter of the plate 25a and defining a bore 25c. The rim 25b engages an outer surface 22b of the case 22 with an appropriate means, such as an interference fit or welding. A bearing holder 26 is mounted to the plate 25a about the bore 25c to secure a ball bearing 27 for supporting the actuator assembly 3 on the hub cover 13 of the gear-clutch assembly 2. An inner surface 27a of the ball bearing 27 is axially fixed to and supported by the spindle 13b of the hub cover 13. To further secure the actuator assembly 3, a snap ring 28 is inserted into the snap ring groove 13g of the spindle 13.

Once the gear assembly 2 and actuator assembly 3 are assembled to form the gear-clutch assembly 1, the gear-clutch assembly 1 is mounted to a supporting shaft 30 as shown in FIGS. 11 and 12. The gear selector 1 slides over the supporting shaft 30 until the internally splined ring 15 engages corresponding splines 32 of the supporting shaft 30 to rotationally fix the ring 15 with the shaft 30. Therefore, in the illustrated embodiment the ring 15 serves as the sole mechanical connection between the gear assembly 2 and the shaft 30. The actuator assembly 3 is rotationally fixed with an appropriate means.

In operation, the electrical coil 21 energizes and de-energizes to respectively disengage and engage the gear 10 with the supporting shaft 30. As shown in FIG. 11, when the electric coil 21 is energized, an electromagnetic field forms in the air gaps between the case 22 and the plunge ring 23 and between the base ring 20 and the plunge ring 23. The electromagnetic field moves the plunge ring 23 toward the electric coil 21 closing the air gaps between the base ring 20, the case, and plunge ring 23. As the plunge ring 21 is moving toward the electric coil 21, it pushes the keys 17 along their ramp surfaces 17c and forces the keys 17 into the grooves 12k in the hub 12, thereby disengaging the gear 10 from the shaft 30.

As shown in FIG. 12, when electric coil 21 is de-energized, the plunge ring 23 retracts back and moves away from the electric coil 21 by at least one key 17 that is urged outwardly from its retracted position to the engagement position by springs 18. As mentioned above, in the engagement position the keys 17 insert into corresponding grooves 10c of the gear 10, thereby engaging the gear 10 with the shaft 30. In this position, rotational forces are transferred from the supporting shaft 30 to the gear 10 or vice versa. In the present embodiment, when de-energized, there will always be at least three keys 17 that are urged outwardly from their retracted positions and pushing the plunge ring 23 axially away from the electric coil 21.

During engagement, if the speeds of the hub 12 and gear 10 are not synchronized, there will be an impact load exerted on shaft 30. As mentioned above, spring 14 and ramp rings 15 and 16 substantially reduce the torsion impact load.

The embodiment shown here is to disclose the invention. It by no means restricts the scope of the invention.

The invention claimed is:

1. A gear-clutch assembly organized about an axis and comprising:
    a gear having grooves that open inwardly toward the axis and extend axially;
    a hub located within the gear where it is capable of rotating within the gear, the hub having grooves that open outwardly away from the axis and extend axially;
    keys located within the grooves of the hub and being capable of moving radially toward and away from the axis, the keys being arranged such that when the keys are permitted to move away from the axis, at least one key will enter one of the grooves of the gear to couple the gear and hub so that they will rotate in unison;
    the grooves of the gear being arranged relative to the keys located within the grooves of the hub so that at least one key is positioned to enter one of the grooves of the gear at any angular alignment between the gear and the hub;
    wherein the number of keys is evenly divisible by the difference in the number of grooves between the hub and the gear; and
    an actuator for effecting radial displacement of the keys.

2. An assembly according to claim 1 and further comprising springs for urging the keys outwardly away from the axis; and wherein the actuator when energized moves the keys inwardly toward the axis.

3. An assembly according to claim 2, wherein the actuator comprises:
    an electric coil axially fixed about the keys;
    a plunge ring capable of moving axially about the keys;
    wherein the electric coil when energized moves the plunge ring axially toward the electric coil so that the plunge ring pushes against ramp surfaces of the keys, thereby moving the keys inwardly toward the axis; and
    wherein the springs when the electric coil is de-energized urge the keys outwardly from the axis so that the ramp surfaces of the keys push against the plunge ring to move the plunge ring axially away from the electric coil.

4. An assembly according to claim 1, further comprising means for absorbing torsion impact loads.

5. An assembly according to claim 4, wherein the means for absorbing torsion impact loads comprises:
    an internally splined ring located within the hub having a ramped face and having splines engaged with a supporting shaft so that the internally splined ring is rotationally fixed to the supporting shaft;
    an externally splined ring located within the hub having a ramped face engaged with the ramped face of the internally splined ring and having splines engaged with the hub so that the externally splined ring is rotationally fixed to the hub and moves axially within the hub;
    a spring located within the hub biasing the externally splined ramp axially against the internally splined ring, wherein rotation of the internally splined ring relative to the externally splined ring compresses the spring.

6. A method of operating a gear-clutch assembly organized about an axis, comprising the steps of:
    providing a gear having grooves that open inwardly toward the axis and extend axially;
    providing a hub within the gear where it is capable of rotating within the gear, the hub having grooves that open outwardly away from the axis and extend axially;
    providing keys within the grooves of the hub, the keys being capable of moving radially toward and away from the axis, the keys being arranged such that when the keys are permitted to move away from the axis, at least one key will enter one of the grooves of the gear to couple the gear and hub so that they will rotate in unison;
    the grooves of the gear being arranged relative to the keys located within the grooves of the hub so that at least one key is positioned to enter one of the grooves of the gear at any angular alignment between the gear and the hub;
    wherein the number of keys is evenly divisible by the difference in the number of grooves between the hub and the gear;
    providing an actuator for effecting radial displacement of the keys;
    energizing the actuator to uncouple the keys with the gear; and
    de-energizing the actuator to couple the keys from the gear.

7. The method of claim 6 further comprising the step of providing a means for absorbing torsion impact loads.

8. The method of claim 7 wherein the means for absorbing torsion impact loads comprises:
    an internally splined ring located within the hub having a ramped face and having splines engaged with a supporting shaft so that the internally splined ring is rotationally fixed to the supporting shaft;
    an externally splined ring located within the hub having a ramped face engaged with the ramped face of the internally splined ring and having splines engaged with the hub so that the externally splined ring is rotationally fixed to the hub and moves axially within the hub;
    a spring located within the hub biasing the externally splined ramp axially against the internally splined ring, wherein rotation of the internally splined ring relative to the externally splined ring compresses the spring.

* * * * *

UNITED STATES PATENT AND TRADEMARK OFFICE
CERTIFICATE OF CORRECTION

| | | |
|---|---|---|
| PATENT NO. | : 7,717,249 B2 | Page 1 of 1 |
| APPLICATION NO. | : 10/585024 | |
| DATED | : May 18, 2010 | |
| INVENTOR(S) | : Xiaolan Ai | |

It is certified that error appears in the above-identified patent and that said Letters Patent is hereby corrected as shown below:

Column 1, line 46, the words "In side" should read --inside--;

Column 1, line 47, the word --to-- should be between the word "seats" and the word "transmit"

Signed and Sealed this
Thirty-first Day of May, 2011

David J. Kappos
*Director of the United States Patent and Trademark Office*